(12) United States Patent
Langworthy

(10) Patent No.: US 7,664,723 B2
(45) Date of Patent: Feb. 16, 2010

(54) SYMBOLIC COMPUTATION USING AN INVERTED MATCH

(75) Inventor: David E. Langworthy, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 185 days.

(21) Appl. No.: 11/225,307

(22) Filed: Sep. 12, 2005

(65) Prior Publication Data

US 2007/0061115 A1   Mar. 15, 2007

(51) Int. Cl.
G06F 15/18 (2006.01)
G06F 15/00 (2006.01)
G06N 7/00 (2006.01)
G06N 7/08 (2006.01)

(52) U.S. Cl. .......................................... 706/62; 706/56
(58) Field of Classification Search .................... 706/29, 706/28, 62, 56; 703/14, 2, 13, 17
See application file for complete search history.

(56) References Cited

U.S. PATENT DOCUMENTS

2004/0236554 A1 * 11/2004 Raghavan et al. ............. 703/11

OTHER PUBLICATIONS

'hp 33s scientific calculator, user's guide': Hewlett Packard, 2003, 1-10, 1-24, 2-1, 2-2, 2-13, 12-23 through 12-25.*
'Algorithmic aspects of symbolic switch network analysis': Bryant, 1987, IEEE, 0278-0070/87, pp. 618-633.*
Brane Calculi, Interactions of Biological Membrances, Lucca Cardelli Jun. 1, 2004.

* cited by examiner

Primary Examiner—David R Vincent
Assistant Examiner—Peter Coughlan
(74) Attorney, Agent, or Firm—Workman Nydegger

(57) ABSTRACT

The transformation of a symbolic representation using an inverted match that represents an inverted form of a specific kind of non-linear match. The match is inverted around a particular reaction variable and merged on that variable after determining that the match represents a specific kind of non-linear identity that has at least one associative commutative operator, and in which each variable has one instance, except for the reaction variable, which has multiple instances in the match, at least one of the instances not being a direct argument of an associative commutative operator. The inverted match may then be applied to the symbolic expression to thereby transform the symbolic expression.

20 Claims, 7 Drawing Sheets

Sequent Calculus
Atom Implies Left

AC Operators: ,
Operators: → Atom
Free Variables: G C
Reaction Variable: P

Pi Calculus Reaction

AC Operators: ,
Operators: . _
Free Variables: R P Q M N
Reaction Variable: a

SYMBOLIC COMPUTATION USING AN INVERTED MATCH

BACKGROUND

Computers have transformed the way that we access data, process information, and communicate. For instance, computing systems may be used to represent and utilize even complex equations and other symbolic representations. Such equations may represent physical algebraic equations, logic programming, commutating systems, and physical, chemical and biological systems.

Before fully applying an equation, it is desirable transform an equation or other symbolic representation. One transformation is the reduction of an equation. Another transformation is a "reaction" as represented in biological simulations or workflow. The following identities (1) through (6) each represent a relative simple well-known algebraic identity where Y is the algebraic variable and will be subsequently used to describe an algebraic equation reduction operation:

$$Y \times 0 = 0 \quad (1)$$

$$Y \times 1 = Y \quad (2)$$

$$Y + 0 = Y \quad (3)$$

$$Y + -Y = 0 \quad (4)$$

$$Y \times (1/Y) = 1 \quad (5)$$

$$Y \times Y = Y^2 \quad (6)$$

The identities hold true for every value of Y, except equation (5), which is valid at all values of Y except for zero. Other identities exist for logic programming, commutating systems, and physical, chemical and biological systems.

As previously mentioned, identities may be used to simplify or otherwise transform an equation. For instance, consider the following algebraic equation (7).

$$Z = (A \times 1) + (B + 0) + -(A + 0) + (C \times 0) + -C + A - 1 + (D \times (1/D)) + A + -B \quad (7)$$

Applying identity (1) to equation (7) yields the following simplified form of equation (7) as equation (8).

$$Z = (A \times 1) + (B + 0) + -(A + 0) + 0 + -C + A - 1 + (D \times (1/D)) + A + -B \quad (8)$$

Applying identity (2) to equation (8) yields the following simplified form of equation (8) presented as equation (9):

$$Z = A + (B + 0) + -(A + 0) + 0 + -C + A - 1 + (D \times (1/D)) + A + -B \quad (9)$$

Applying identity (3) to equation (9) yields the following simplified form of equation (9) presented as equation (10):

$$Z = A + B + -A + -C + A - 1 + (D \times (1/D)) + A + -B \quad (10)$$

Applying identity (4) to equation (10) yields the following simplified form of equation (10) presented as equation (11):

$$Z = -C + A - 1 + (D \times (1/D)) + A \quad (11)$$

Applying identity (5) to equation (11) yields the following simplified form of equation (11) presented as equation (12):

$$Z = -C + A - 1 + 1 + A \quad (12)$$

Applying identity (4) once again yields equation (13) as follows:

$$Z = -C + A + A \quad (13)$$

Which may be rewritten as equation 14:

$$Z = -C + 2A \quad (14)$$

Thus, the application of identities may go far to reduce equations into simpler, more manageable forms. Identities may also be used to perform other transformations on either equations or other symbolic representations.

Computing systems may perform these types of equation reductions in order to simplify processing associated with applying the equation. While the reductions shown above with respect to equations (7) through (14) involve just a dozen or so terms, computing systems may efficiently process equations involving many millions of terms. Nevertheless, there can be significant savings in processing time when computer-representations of equations are reduced to simpler forms, even if those simpler forms still involve many millions of terms.

One structure used to represent a side of an identity is referred to in the art as a "match". FIG. 1A illustrates a match that represents the identity of equation (1). Matches are generally structured as a hierarchical tree, with parent nodes representing operators that join or apply to descendent terms represented by descendent branches in a particular manner defined by the operator. FIGS. 1B through 1F each illustrate a match that represents the identity of respective equations (2) through (6). Similar matches are used to represent non-algebraic equations as well. In FIGS. 1A through 1F, some operators are Associative Commutative (AC) and others are not. For instance, plus "+", and times "×" are AC operators, whereas minus "−", reciprocal "÷", and exponent "^" are not AC operators.

There are several types of identities, linear identities and non-linear identities. A linear identity is an identity in which each side of the equation has just one occurrence of each variable. A non-linear identity is an identity in which at least one side has at least one variable that occurs multiple times. For instance, referring to FIGS. 1A through 1C, the only variable in the match (i.e., Y) occurs only once (at most) on each side of the equation. Thus, the identities represented by FIGS. 1A through 1C are linear identities. On the other hand, the variable (i.e., Y) occurs twice on the left-hand side of the identities of FIGS. 1D and 1E. Thus, the identities represented by FIGS. 1D and 1E are non-linear.

Matches may be used to represent identities for non-algebraic equations as well. For example, FIG. 2 shows a match for one side of an equation for a sequent calculus definition of propositional logic. In this match the comma (,) is an associative commutative context operator. The two other operators in the pattern below are implies (→) and Atom. G, P, and C are variables. G and C occur only once while P occurs twice which constrains the binding of the pattern to the subject. The constraint is indicated by the dotted line. P is referred to as the reaction variable in this kind of match. The match of FIG. 2 represents the proposition of propositional logic that if a first fact (along with any other information) is known, and the first fact implies a second fact, then the second fact is also known.

FIG. 3 shows a match for one side of an equation used in Pi calculus communicating process interact with channels. In the theory, par (|) and alternative (+) are Associative Commutative (AC) operators. Sequence (.) and bar (_) are regular operators. The reaction variable in FIG. 3 is "a". The others variables are only used once.

FIG. 4 shows a match for one side of an equation used in the Phago reaction of Brane calculus (refer to Article by Luca Calculi entitled *Interactions of Biological Membranes*, which is cited by the Applicant) used to represent biological systems. In this theory, the system and membrane composition operators (o and |) are AC operators. The reaction variable is n.

Linear identities may be easily applied to reduce equations using fast algorithms. Non-linear identities are, on the other hand, NP hard. Accordingly, it can be quite computationally intensive to apply non-linear identities to reduce equations.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles of the present invention relate to the transformation of a symbolic expression, such as an equation, using a specific kind of non-linear identity by using an inverted match that represents an inverted form of the specific kind of non-linear match. The match is inverted around a particular variable (hereinafter referred to as a "reaction variable") and merged on that variable after determining that the match represents the specific kind of non-linear identity. The particular non-linear identity is one that has at least one associative commutative operator, and in which each variable has one instance, except for the reaction variable. The reaction variable has multiple instances in the match, at least one of the instances not being a direct argument of an associative commutative operator. The inverted match may then be applied to the symbolic expression to thereby transform the symbolic expression.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
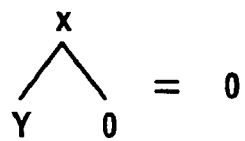
FIG. 1A schematically illustrates a representation of a match data structure that represents a match corresponding to the identity of Equation (1)

The principles of the present invention relate to the transformation of a symbolic expression using an inverted match that represents an inverted form of a specific kind of non-linear match. The match is inverted around a particular reaction variable and merged on that variable after determining that the match represents a specific kind of non-linear identity that is suitable for such an inversion. The inverted match may then be applied to the symbolic expression to thereby transform the symbolic expression.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

Figure 5:
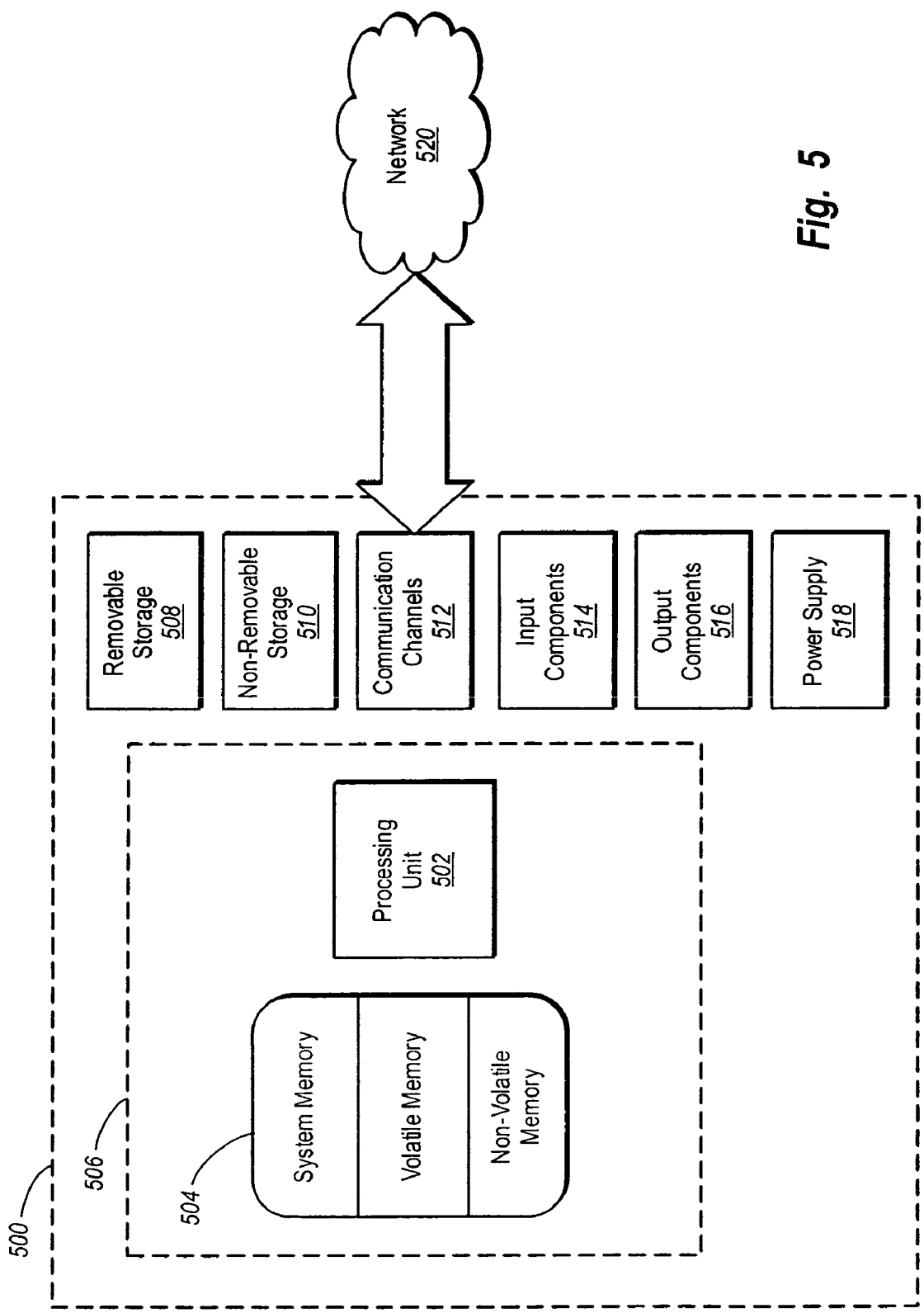
FIG. 5 illustrates a suitable computing system that may implement features of the present invention.

FIG. 5 shows a schematic diagram of an example computer architecture that may implement the principles of the present invention. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 5.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 500 typically includes at least one processing unit 502 and memory 504. The memory 504 may be volatile (such as RAM), non-volatile (such as ROM, flash memory, etc.), or some combination of the two. This most basic configuration is illustrated in FIG. 5 by the dashed line 506.

The storage media devices may have additional features and functionality. For example, they may include additional storage (removable and non-removable) including, but not limited to, PCMCIA cards, magnetic and optical disks, and magnetic tape. Such additional storage is illustrated in FIG. 5 by removable storage 508 and non-removable storage 510. Computer-storage media include volatile and non-volatile, removable and non-removable media implemented in any method or technology for storage of information such as computer-readable instructions, data structures, program modules, or other data. Memory 504, removable storage 508, and non-removable storage 510 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 500 may also contain communication channels 512 that allow the host to communicate with other systems and devices over, for example, network 520. Although the network 520 may include any network type (whether now existing or to be developed in the future), examples include Token Ring, Ethernet, Bluetooth, 802.11, USB, 1394, SMS, SOAP over IP, or the like. Communication channels 512 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 500 may also have input components 514 such as a keyboard, mouse, pen, a voice-input component, a touch-input device, and so forth. Output components 516 include screen displays, speakers, printer, etc., and rendering modules (often called "adapters") for driving them. The computing system 500 has a power supply 518. All these components are well known in the art and need not be discussed at length here.

Figure 6:
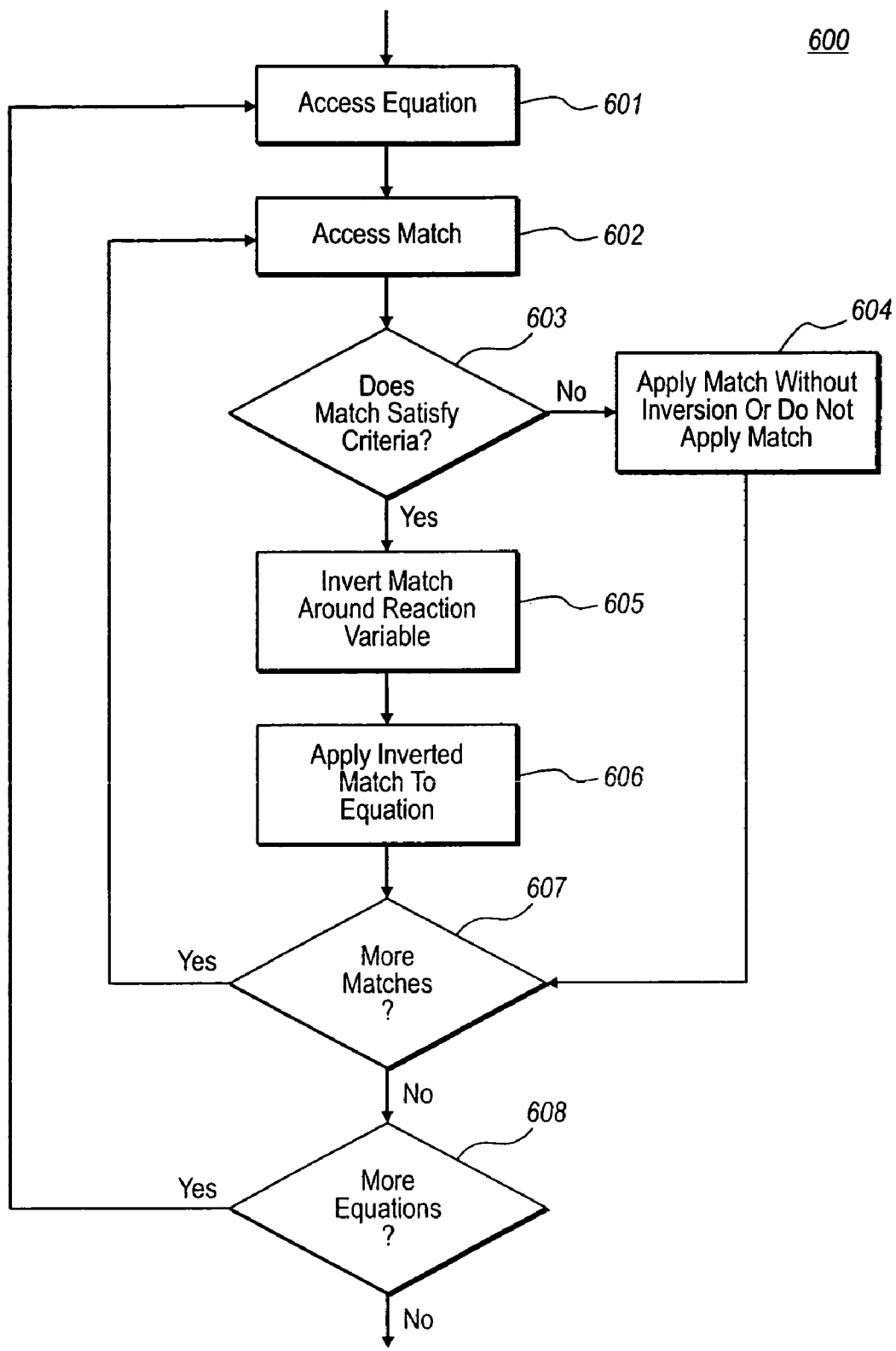
FIG. 6 illustrates a flowchart of a method for reducing an equation using an inverted form of a match that represents a particular kind of non-linear identity that has an Associative Commutative (AC) operator, and having all variables occur at most once on each side of the identity, except for a reaction variable, which occurs multiple times, at least one instance of the reaction variable not being a direct argument of an AC operator.
Figure 7:
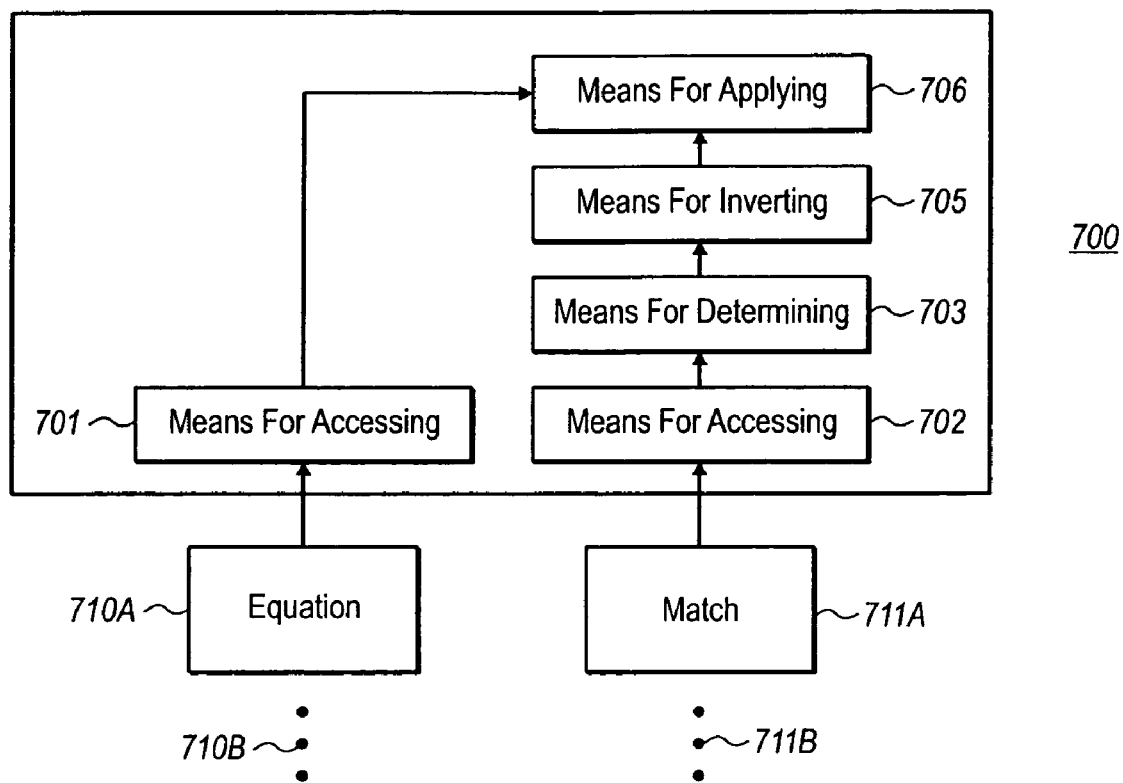
FIG. 7 illustrates a mechanism that is capable of reducing an equation using the inverted form of the match structure in accordance with the principles of the present invention.

FIG. 6 illustrates a flowchart of a method 600 for transformation a symbolic expression using an inverted form of a match in accordance with an embodiment of the present invention. FIG. 7 is a schematic diagram of a system 700 for performing the method 600. Thus, the method of FIG. 6 may be described with frequent reference to the system 700 of FIG. 7.

Referring to FIG. 6, a data structure representing a symbolic expression is accessed (act 601). In this description and in the claims, the term "symbolic expression" is defined as being any equation (whether defining an equality or an inequality) or any other expression, such as, for example, a portion of an equation. An example of an algebraic equation included within the definition of symbolic expression might be, for example, $A+B=C$ or perhaps even $A+B>C$. However, the simple expression $A+B$ is also an example of an algebraic symbolic expression. As an equation is a common type of symbolic expression, the principles of the present invention are described with respect to an equation, although the principles of the present invention may be used to similarly apply to any symbolic expression. The symbolic expression may represent any equation, in any scientific area in which symbolic expressions are used. For instance, an equation may represent a chemical, physical, and/or biological reaction, and/or may represent propositional logic, calculus, or algebraic formulas. The equation need not be accessed all at one time. For instance, the equation need not be all loaded in system memory at once. Instead, only a portion of the equation may be accessed at one time into system memory.

The system 700 of FIG. 7 includes a means for accessing (means 701) a symbolic expression, which may be used to perform the act of accessing (act 601). For instance, the means 701 may access equation 710A, (or any other symbolic expression) as represented by the vertical ellipses 710B. The means 701 may be software, hardware, or a combination of hardware and software. For instance, if the system 700 were the computing system 500 described with respect to FIG. 5, the means 701 may include software in memory 504 as executed by processing unit 502. The equation may be accessed from, for example, volatile storage 508, non-volatile storage 510, or over communication channels 512 from network 520. However, in a more general environment, the equation may be accessed from any memory, storage and/or network location(s).

Returning to FIG. 6, the computing system may also access a representation of a match that represents a mathematical identity (act 602). This may be accomplished using means 702 of FIG. 7, which is illustrated as accessing match 711A amongst potentially other matches as represented by the vertical ellipses 711B. The means 702 may be any software and/or hardware that is capable of accessing a match, and may, be need not, be the same means 701 as are used to access the equation 710A. Examples of matches are illustrated and described with respect to FIGS. 1A through 1E, and FIGS. 2 through 4. Although the act of accessing the match (act 602) is illustrated as occurring after the act of accessing the equation or other symbolic expression (act 601). The match may be accessed at any time, even before the equation or other symbolic expression is accessed.

After accessing the match (act 602), the computing system determines that the match is a particular kind of match (decision block 603) that satisfies the following criteria:

1) The match includes at least one associative commutative operator;
2) each variable in the match is used only once with the exception of the reaction variable, which has multiple instances in the match; and
3) at least one instance in the match is not a direct argument of an associative commutative operator.

This determination may be made by the determining means 703 of FIG. 7, which may be any hardware and/or software that is capable of making such a determination.

Returning to the matches of FIGS. 1A through 1E, and FIGS. 2 through 4, each of matches includes at least one associative commutative operator. For instance, the matches of FIGS. 1A, 1B and 1E include the multiplication "×" associative commutative operator. The matches of FIGS. 1C and 1D include the addition "+" associative commutative operator. The match of FIG. 2 includes a comma "," which is an associative commutative operator of sequent calculus. The match of FIG. 3 includes several operators that are associative commutative under the theory of Pi calculus including par "|" and alternative "+". The match of FIG. 4 includes several operators that are associative commutative under the theory of Brane calculus include system "o" and membrane composition "|" operators. Thus, each of the matches of FIGS. 1A through 1E, and 2 through 4 satisfy the first criterion.

Figure 1B:
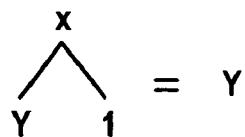
FIG. 1B schematically illustrates a representation of a match data structure that represents a match corresponding to the identity of Equation (2)
Figure 1C:
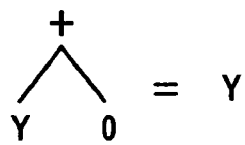
FIG. 1C schematically illustrates a representation of a match data structure that represents a match corresponding to the identity of Equation (3)

However, the matches of FIGS. 1A, 1B and 1C do not satisfy the second criterion since each variable is only used once on each side of the equation without any exceptions. The matches of FIGS. 1D and 1E do satisfy the second criterion since there is only one variable, the reaction variable, and since that reaction variable has multiple instances (two in each case). The match of FIG. 2 satisfies the second criterion since each variable (e.g., variables G and C) all occur only once, and the reaction variable (e.g., variable P) occurs multiple times. The match of FIG. 3 satisfies the second criterion since each variable (e.g., variables R, P, Q, M and N) all occur only once, and the reaction variable (e.g., variable a) occurs multiple times. The match of FIG. 4 satisfies the second criterion since each variable (e.g., variables G, P, Q, $S_0$, $T_0$, S and T) all occur only once, and the reaction variable (e.g., variable n) occurs multiple times. Thus, the matches of FIGS. 1D, 1E, 2, 3 and 4 satisfy the second criterion, whereas the matches of FIGS. 1A through 1C do not. Another example of a pattern that would not satisfy criteria number three is $A \times A = A^2$ as illustrated in FIG. 1F.

Figure 1D:
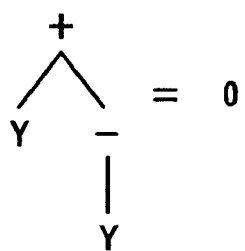
FIG. 1D schematically illustrates a representation of a match data structure that represents a match corresponding to the identity of Equation (4)
Figure 1E:
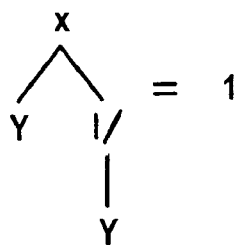
FIG. 1E schematically illustrates a representation of a match data structure that represents a match corresponding to the identity of Equation (5)
Figure 1F:
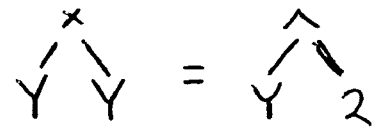
FIG. 1F schematically illustrates a representation of a match data structure that represents a match corresponding to the identity of Equation (6)

The match of FIG. 1D also satisfies the third criteria since there is at least once instance of the reaction variable Y which is not a direct argument of an associative commutative argument. For instance, once instance of Y is a direct argument of the minus operator "−", which is not an associative commutative operator. FIG. 1E also satisfies the third criterion since one instance of the reaction variable Y is a direct argument of the reciprocal operator "1/", which is not an associative commutative operator. The match of FIG. 2 satisfies the third criterion since one instance of the reaction variable P is guarded by the implies operator "→". The match of FIG. 3 satisfies the third criterion since both instances of the reaction variable "a" are a direct argument of operators (e.g., sequence operator "." in one case, and bar "_" in the other case) that are not associative commutative under Pi calculus. The match of FIG. 4 satisfies the third criterion since both instances of the reaction variable "n" are a direct argument of operators (e.g., Phago in one case, and CoPhago in the other) that are not associative commutative under Brane calculus. Thus, the matches of FIGS. 1D, 1E, 2, 3 and 4, each satisfy the third criterion in addition to the first and second criterion. Thus, these matches of FIGS. 1D, 1E, 2, 3, and 4 would result in processing branching along the "Yes" path in decision block 603 of FIG. 6. The matches of FIGS. 1A through 1C would result in processing along the "No" path in decision block 603 of FIG. 6.

Specifically, if the match is determined to not satisfy all of the criteria (No in decision block 603), then the match is either applied to the equation or other symbolic expression without inversion, or the match is not applied at all (act 604), thereby completing processing for that match. It is then determined whether or not there are more matches to be applied to the equation (decision block 607).

On the other had, if the match is determined to satisfy all of the criteria (Yes in decision block 603), then the match is inverted (act 605). This inversion may be performed by the means for inverting (means 705) of FIG. 7, which may be any hardware and/or software that is capable of performing the inversion of FIG. 8.

Figure 8:
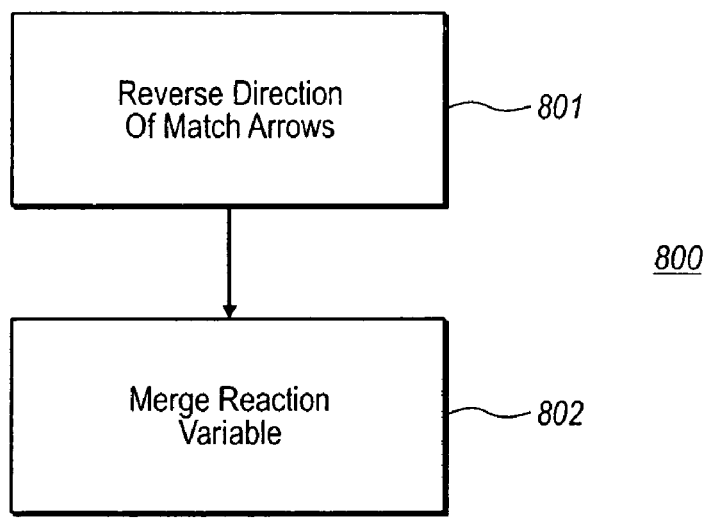
FIG. 8 illustrates a method for inverting a match in accordance with the principles of the present invention.
Figure 9:
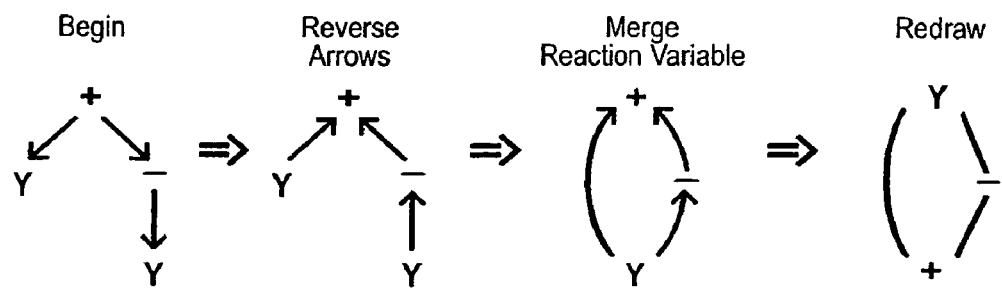
FIG. 9 illustrates the inversion process illustrated and described with respect to FIG. 6 as applied to the match of FIG. 1D.

FIG. 8 illustrates a flowchart of a method 800 for inverting. First, the direction of the match arrows are reversed (act 801), and then the reaction variable is merged (act 802). As an example of inversion, FIG. 9 illustrated the process flow associated with inverting the match of FIG. 1D. The process begins with the match of FIG. 1D in FIG. 9. Then, the direction arrows of the match are reversed, so that one instance of the reaction variable Y is pointing towards the addition operator "+", and the other instance of the reaction variable "Y" is pointing towards the subtraction operator "−", which is pointing towards the addition operator "+". The reaction variable Y is then merged. For clarity, the final structure is redrawn.

Figure 2:
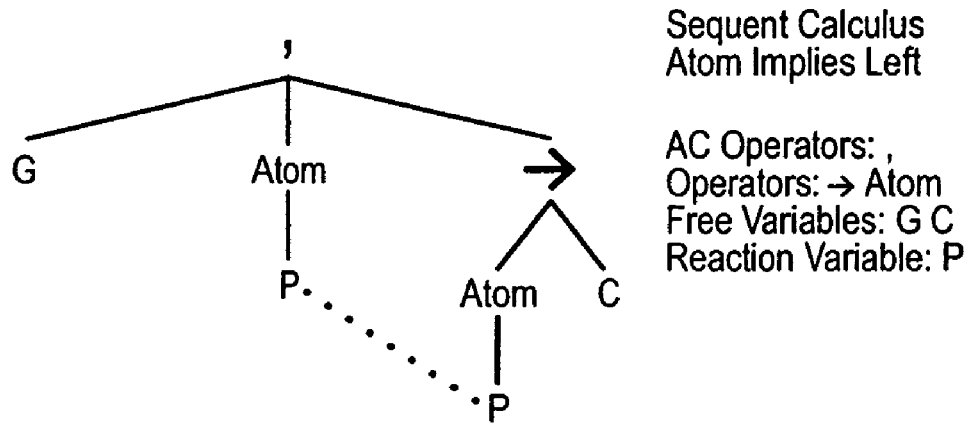
FIG. 2 schematically illustrates a representation of a match data structure that represents a match for one side of an equation for a sequent calculus definition of propositional logic.
Figure 3:
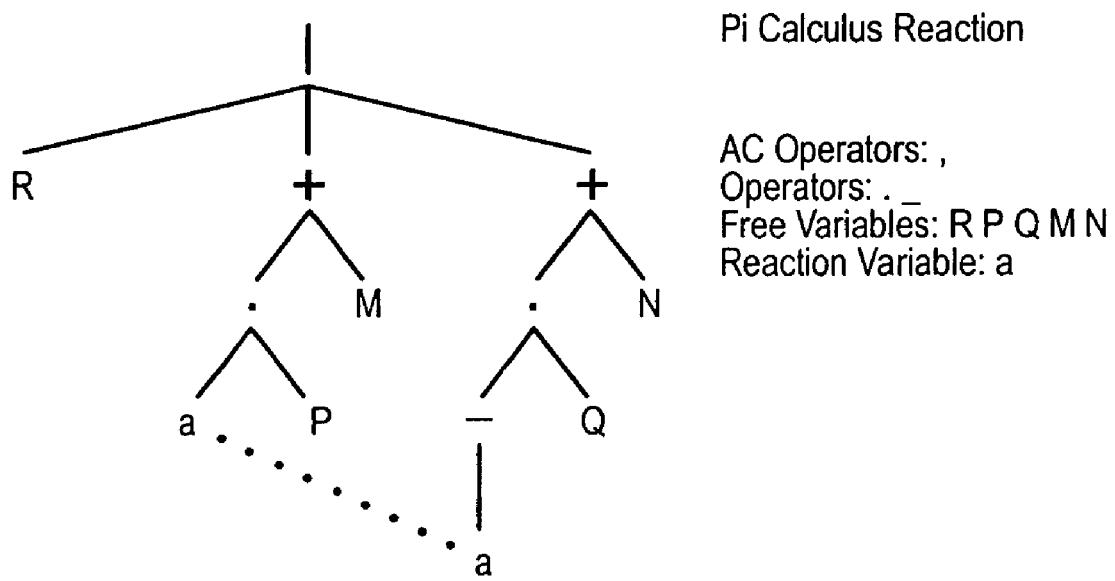
FIG. 3 schematically illustrates a representation of a match data structure that represents a match for one side of an equation used in Pi calculus process interact with channels.
Figure 4:
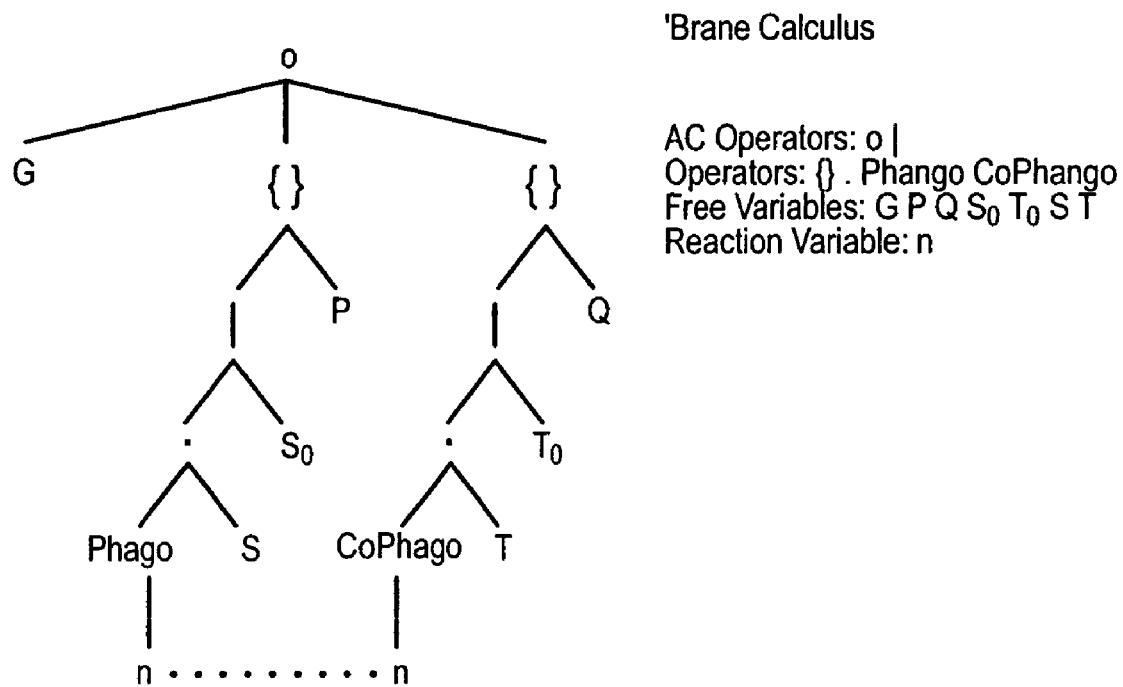
FIG. 4 schematically illustrates a representation of a match data structure used in the Phago reaction of Brane calculus used to represent biological systems.
Figure 10:
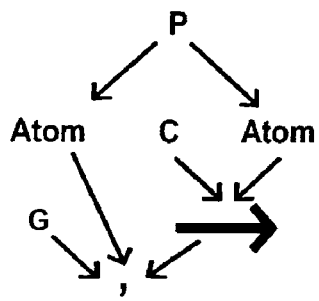
FIG. 10 illustrates an inverted form of the match of FIG. 2.
Figure 11:
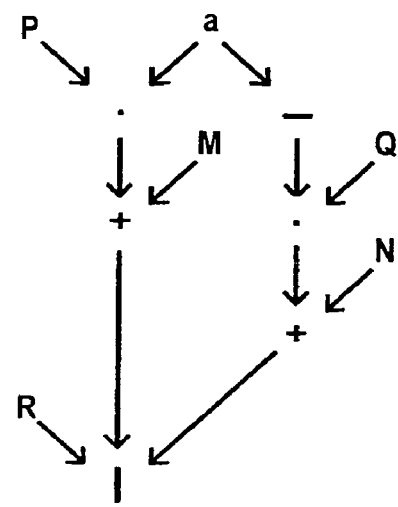
FIG. 11 illustrates an inverted form of the match of FIG. 3.
Figure 12:
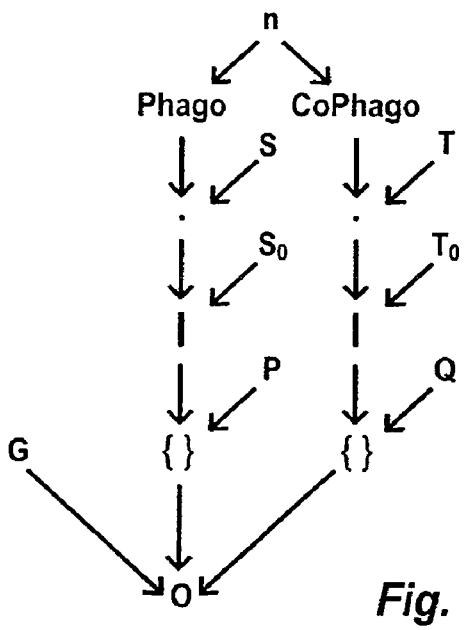
FIG. 12 illustrates an inverted form of the match of FIG. 4.

The redrawn match makes clear that instead of finding one positive variable in the equation and then scanning through a potential complex equation for finding a corresponding one negative variable in the equation, and then canceling them out, that a process can use the inverted pattern in which like variables are grouped so as to more efficiently match a positive and negative occurrence of the variable. As a further optimization, the process can scan through the equation, and count the number of positive occurrences of the variable, and the number of negative occurrences of the variable. The positive and negative count can then be made to offset each other to obtain a final number. While this may seem a very simple example, the principles may be extended to complex matches. For instance, FIGS. 10, 11 and 12 show the resulting inverted matches when the corresponding matches of FIGS. 2, 3 and 4 are subjected to the method 800 of FIG. 8. Thus, so long as the match satisfies the three criteria checked for in decision block 603, the match may be inverting around the reaction variable (act 605).

The inverted match may then be applied to the equation or other symbolic expression (act 606) to thereby transform the symbolic expression (e.g., to perform a reduction of an algebraic equation). It would not be obvious to one of ordinary skill in the art that the match could be inverted as described herein to obtain an inverted form of the match, where the inverted form of the match may be applied with the same results as the original match. However, given the inverted match and the description herein, one of ordinary skill in the art would realize how to apply the inverted match to an equation. Accordingly, the details regarding how to apply inverted matches of FIGS. 2, 3 and 4 will not be described in detail herein. The inverted match may be applied to the symbolic expression using, for example, the means for applying (means 706) of FIG. 7, which may be any hardware and/or software capable of apply a match to an equation.

If there are more matches representing identities to be used to transform or reduce the symbolic expressions (Yes in decision block 607), then those matches may be accessed and the process repeats for those matches as well. On the other hand, if there are no more matches to be applied to the symbolic expressions (No in decision block 607), then it is determined whether transformation of other symbolic expressions is to occur (decision block 608). If there are more symbolic expressions (Yes in decision block 608), then the process repeats for one or more other equations as well. If there are no more equations (No in decision block 608), then the process ends or continues to other acts or steps.

Accordingly, the principles of the present invention allow for some types of non-linear identities to be more easily applied to reduce or otherwise transform equations or other symbolic expressions. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising:
one or more computer-readable storage media having thereon computer-executable instructions that, when executed by one or more processors of a computing system, cause the computing system to perform the following to reduce and simplify symbolic expressions:
access a data structure that represents a symbolic expression;
access a representation of a match that represents a mathematical identity;
determine whether the match meets each of the following constraints:
(i) the match has an associative commutative operator;
(ii) each variable in the match is used only once in the match, except for just one reaction variable that has a plurality of instances in the match, wherein a reaction variable is any variable that has a plurality of instances; and
(iii) at least one instance in the match is not a direct argument of an associative commutative operator;
invert the match around the reaction variable that has a plurality of instances in the match after accessing the data structure that represents the symbolic expression and in response to the act of determining, and only when each of constraints (i)-(iii) is satisfied; and
apply the inverted match to the symbolic expression and thereby reducing the symbolic expression by reducing instances of only the reaction variable in the symbolic expression.

2. A computer program product in accordance with claim 1, wherein the one or more computer-readable storage media are memory media.

3. A computer program product in accordance with claim 1, wherein the symbolic expression is a non-algebraic equation of sequent calculus, and includes each of Atom, comma, and implies operators of sequent calculus.

4. A computer program product in accordance with claim 1, wherein the match represents an operator from Pi calculus.

5. A computer program product in accordance with claim 1, wherein the match represents a Phago reaction from Brane calculus.

6. A computer program product in accordance with claim 1, wherein the match is a first match, the mathematical identity is a first mathematical identity, and the one or more computer-readable media further have thereon computer-executable instructions that, when executed by the one or more processors, cause the computing system to perform the following:
repeat the acts of determining, inverting, and applying for one or more matches beyond the first match.

7. A computer program product in accordance with claim 1, wherein the reaction variable has just one instance that is not a direct argument of an associative commutative operator.

8. A computer program product in accordance with claim 1, wherein the reaction variable has a plurality of instances in which each instances is not a direct argument of an associative commutative operator.

9. A computer program product in accordance with claim 1, wherein the match is a first match, the mathematical identity is a first mathematical identity, and the one or more computer-readable storage media further have thereon computer-executable instructions that, when executed by the one or more processors, cause the computing system to perform the following:
determine there are more matches and, in response, access a representation of at least one other match that represents a second mathematical identity; and
determine that the at least one other match does not satisfy every one of constraints (i)-(iii), and abstain from inverting the at least one other match.

10. A computer program product comprising:
one or more computer-readable storage media having thereon the following:
means for accessing a digital representation of a match that represents a mathematical identity;
means for determining whether the match satisfies the following constraints:
(i) the match has an associative commutative operator;
(ii) each variable in the match is used only once in the match, except for just one reaction variable that has a plurality of instances in the match, wherein a reaction variable is any variable that has a plurality of instances; and
(iii) the match includes at least one instance that is not a direct argument of an associative commutative operator;
means for inverting the match around the reaction variable that has a plurality of instances in the match in response to the act of determining, and only when each of constraints (i)-(iii) is satisfied after accessing the match; and
means for applying the inverted match to a symbolic expression and reducing the symbolic expression by reducing instances of only the reaction variable in the symbolic expression.

11. A computer program product in accordance with claim 10, wherein the one or more computer-readable storage media are physical memory media.

12. A computer program product in accordance with claim 10, wherein the match represents an identity that if a first fact is known, and the first fact implies a second fact, then the second fact is also known.

13. A computer program product in accordance with claim 10, wherein the match represents an operator from Pi calculus.

14. A computer program product in accordance with claim 10, wherein the match represents a Phago reaction from Brane calculus.

15. A computer program product in accordance with claim 10, wherein the match is a first match, the mathematical identity is a first mathematical identity, and the one or more computer-readable media further have thereon the following:
   means for repeating the acts of determining, inverting, and applying for one or more matches beyond the first match.

16. A computer program product in accordance with claim 10, wherein the reaction variable has just one instance that is not a direct argument of an associative commutative operator.

17. A computer program product in accordance with claim 10, wherein the reaction variable has a plurality of instances in which each instances is not a direct argument of an associative commutative operator.

18. A computer program product in accordance with claim 10, wherein the match is a first match, the mathematical identity is a first mathematical identity, and the one or more computer-readable media further have thereon the following:
   means for determining whether there are more matches and, when so, accessing a representation of at least one other match that represents a second mathematical identity; and
   means for determining that the at least one other match does not satisfy every one of the constraints (i)-(iii) and abstaining from inverting the at least one other match.

19. A computer program product comprising:
   one or more computer-readable media having thereon computer-executable instructions that, when executed by one or more processors of a computing system, cause the computing system to perform the following to reduce and simplify non-linear equations for simplified processing of the same:
      access a data structure that has stored therein an equation representative of a chemical or biological reaction;
      access a representation of a match that represents a non-linear mathematical identity, the match being structured as a hierarchical tree and the non-linear mathematical identity being present in the equation representative of the chemical or biological reaction;
      determine whether the match meets each of the following constraints:
         (i) that the match has an associative commutative operator;
         (ii) that each variable in the match is used only once in the match, except for Just one reaction variable that has a plurality of instances in the match; and
         (iii) that the match includes at least one instance that is not a direct argument of an associative commutative operator;
      after accessing the data structure that represents the equation representative of a chemical or biological reaction, in response to the act of determining, invert the match around the reaction variable that has a plurality of instances in the match only when each of constraints (i)-(iii) are satisfied, and abstaining from inverting the match around the reaction variable when any of constraints (i)-(iii) is not satisfied, wherein inverting the match around the reaction variable consists of:
      drawing arrows between operators and variables in the match, wherein the match has been accessed prior to drawing such arrows;
      after drawing the arrows, inverting all the arrows in the match;
      merging instances of the reaction variable, wherein merging instances of the reaction variable includes grouping each of the plurality of instances of the reaction variable into a single instance with arrows inverted; and
      redrawing the match, wherein the redrawn match has only a single instance of the reaction variable and continues to have only a single instance of each other variable in the match;
      apply the inverted match to the equation representative of a chemical or biological reaction to thereby reduce the chemical or biological reaction; and
      repeat the acts of determining, inverting, and applying for one or more matches beyond the match.

20. A computer program product in accordance with claim 19, wherein the one or more computer-readable media are physical memory.

* * * * *